Patented Nov. 1, 1932

1,885,609

UNITED STATES PATENT OFFICE

HANS LEEMANN, HEINRICH LIER, AND OSKAR KNECHT, OF BASEL, SWITZERLAND, ASSIGNORS TO CHEMICAL WORKS FORMERLY SANDOZ, OF BASEL, SWITZERLAND, A FIRM

MANUFACTURE OF POLYAZO DYESTUFFS

No Drawing. Application filed June 19, 1931. Serial No. 545,616.

According to the process described in the British Patent No. 313,562 valuable polyazo dyestuffs can be obtained by first coupling one molecule of a tetrazotized diamine of the diaryl series in mineral acid solution with one molecule of 1:8-aminonaphthol-3:6-disulphonic acid and combining then the intermediate product with one molecule of a monodiazo-compound and one molecule of a metaaminophenol derivative substituted in the amino group by one or two alkyl-, aryl- or aralkyl-radicles The dyestuffs thus produced dye cotton, artificial silk, wool, natural silk and leather in black tints and possess the valuable property of dyeing mixed materials composed of wool or natural silk and artificial silk (viscose, cuprammonium silk) in level and equal black shades. But they are not very suitable for dyeing leather, for the reason, that they are too difficultly soluble in water and too sensitive towards the action of acids. They dye leather which generally possesses an acid reaction, especially chrome-tanned leather, very rapidly but not in level shades.

It has now been found that very valuable polyazo dyestuffs for dyeing all kinds of leather can be prepared by first coupling one molecule of a tetrazotized diamine of the diphenyl series in mineral acid solution with one molecule of 1:8-aminonaphthol-3:6-disulphonic acid, and combining then the intermediate product with one molecule of a sulphonated monodiazo compound of the aryl series and one molecule of a metaaminophenol derivative of the formula:

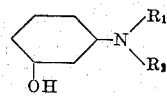

wherein $R_1$ represents alkyl, aryl and aralkyl groups and $R_2$ hydrogen and alkyl groups.

Suitable sulphonated monodiazo compounds of the aryl series that advantageously may be used are those derived from the following compounds: aminobenzene sulphonic acids, their nitro, halogen, alkyl and alkoxy derivatives, such as nitro-aminobenzene sulphonic acids, chloraminobenzene sulphonic acids, methylaminobenzene sulphonic acids, methoxyaminobenzene sulphonic acids, aminonaphthalene mono- and polysulphonic acids and also nitro, alkyl and halogen substitution products of the above cited aminonaphthalene-sulphonic acids.

As suitable metaaminophenol derivatives the following compounds may be cited: N-monoethyl-m-amino-phenol, N-diethyl-m-aminophenol, N-(o-tolyl)-m-amino-phenol, N-(p-tolyl)-m-aminophenol and other substitution products of the N-aryl compounds, like aminophenyl-m-aminophenol, dichlorophenyl-m-aminophenol, chlorophenyl-m-aminophenol, o-methoxyphenyl-m-amino-phenol, naphthyl-m-aminophenol.

The new dyestuffs thus prepared are different from those obtained according to the process described in the British Patent No. 313,562 and possess a much better solubility in cold water, because they contain at least one sulphonic group more than the dyes above cited and are not influenced by organic and inorganic acids. They possess further a very good affinity to leather tanned in any usual way, dyeing it in deep black level shades of good all-around fastness, especially of an improved fastness to light.

The following examples, without being limitative, illustrate the process, the parts being by weight.

Example 1

18.4 parts of benzidine are tetrazotized in the usual manner and coupled in a mineral acid solution with 31.9 parts of 1:8-aminonaphthol-3:6-disulphonic acid. When the formation of the intermediate product is finished, it is combined in presence of sodium carbonate with a diazo compound prepared from 17.3 parts of 1-aminobenzene-3-sulphonic acid and the disazo dyestuff thus obtained transformed into the trisazo dyestuff by adding an alkaline solution of 16.5 parts of N-diethyl-m-aminophenol.

The resulting dyestuff having the formula:

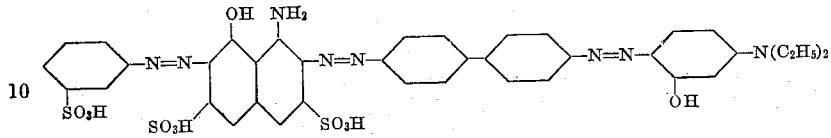

can be isolated by salting out and constitutes in dry state a grey black powder easily soluble in cold water with a violet coloration and in concentrated sulphuric acid with a blue violet coloration. Its aqueous solution when heated with some zinc powder is decolorized, but becomes rapidly dark blue in contact with air.

It dyes chrome-tanned or vegetable tanned leather from a bath containing formic acid in level bluish-black shades. Owing to its very good solubility it can also advantageously be used for brush dyeing of leather.

*Example 2*

One molecule of tetrazotized benzidine is coupled in a mineral acid solution with one molecule of 1:8-aminonaphthol-3:6-disulphonic acid and the intermediate product obtained is combined in presence of sodium carbonate with one molecule of diazotized 2-chloro-5-aminobenzene-1-sulphonic acid. After the formation of the disazo dyestuff a caustic alkaline solution of one molecule of N-(o-tolyl-)-m-aminophenol is added thereto, whereby the formation of the trisazo dyestuff rapidly occurs.

The obtained dyestuff having the formula:

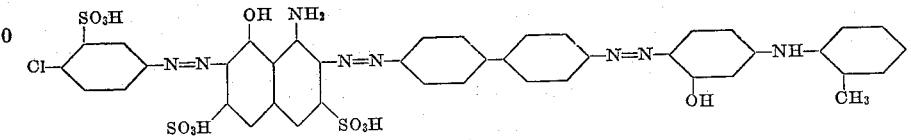

is isolated from the solution in a usual manner and represents in the dry state a black powder with a greenish glance. It is easily soluble in cold water with a dark red-violet and in concentrated sulphuric acid with a blue coloration. Its aqueous solution, when heated with zinc powder is decolorized, but becomes rapidly dark blue in contact with air.

It dyes leather in dark level shades.

Instead of N-(o-tolyl-)m-aminophenol the isomeric N-(p-tolyl)m-aminophenol may be used.

*Example 3*

18.4 parts of benzidine are tetrazotized in the usual way and coupled in a mineral acid solution with 31.9 parts of 1:8 aminonaphthol-3:6-disulphonic acid. When the formation of the intermediate product is finished, it is combined in presence of sodium carbonate with a solution of the diazo compound prepared from 17.3 parts of p-amino-benzene sulphonic acid (sulphanilic acid) and the disazo dyestuff is then transformed into the trisazo dyestuff by addition of a strongly cooled solution of 19.9 parts of N-(o-tolyl-)-m-aminophenol dissolved in 400 parts of water and 19 parts of caustic soda lye of 30%.

The obtained dyestuff having the formula:

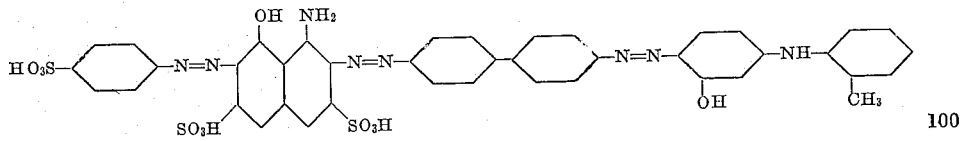

is isolated by acidulating the solution, filtering and drying. In dry form it constitutes a grey black powder with a greenish glance, easily soluble in cold water with a dark violet and in concentrated sulphuric acid with a deep blue coloration. Its aqueous solution when heated with zinc powder is rapidly decolorized, but becomes immediately deep blue in contact with air.

It dyes animal fibres from a neutral or a slight acid bath in deep black shades and possesses also an excellent affinity for regenerated cellulosic fibres. It can, therefore, be advantageously used for level dyeing of mixed materials, composed of e. g. wool and of viscose rayon. It can also be succesfully used for dyeing all kinds of leather in bluish black shades.

*Example 4*

One molecule of a tetrazotized benzidine is combined in a mineral acid solution with one molecule of 1:8-amidonaphthol-3:6-disulphonic acid and the formed intermediate product is combined in presence of sodium carbonate with one molecule of diazotized 3-methyl-4-amido-benzene-1-sulphonic acid. After the formation of the disazo dyestuff is finished it is transformed into the trisazo dyestuff by adding to its solution a caustic alkaline solution of one molecule of N-(-o-tolyl)-m-amino-phenol.

The dyestuff isolated in the usual way possesses the formula:

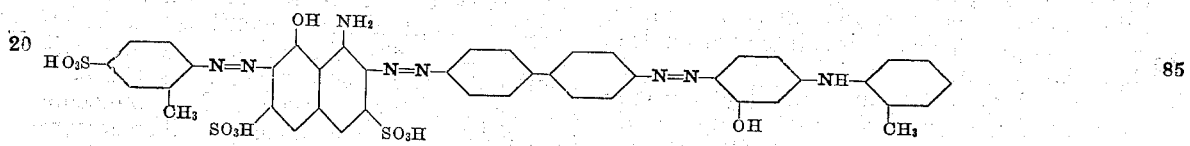

and constitutes in dry state a black powder, easily soluble in water with a dark violet and in concentrated sulphuric acid with a deep blue coloration. Its aqueous solution, when heated with some zinc powder, is rapidly nearly decolorized, but becomes blue in contact with air.

It dyes artificial silk from a neutral bath and animal fibres from neutral or slightly acid bath in deep black shades and can advantageously be used for the production of level dyeings on mixed material composed of the above said fibres.

All kinds of leather are dyed from a dye bath in level deep bluish black shades of excellent fastness to rubbing. The dyestuff can also advantageously be used for brush dyeing, giving deep black shades without any glance.

*Example 5*

18.4 parts of tetrazotized benzidine are combined in a mineral acid solution with 31.9 parts of 1:8-amidonaphthol-3:6-disulphonic acid and the intermediate product obtained is further combined in presence of sodium carbonate with 22.3 parts of diazotized 1-aminonaphthalene-4-sulphonic acid. After the formation of the disazo dyestuff has occurred, it is transformed into the trisazo compound by adding to its solution a well cooled solution of 19.9 parts of N-(o-tolyl-)-m-aminophenol, dissolved in 400 parts of water and 19 parts of a sodium hydroxide solution of 30%.

The new dyestuff having the formula:

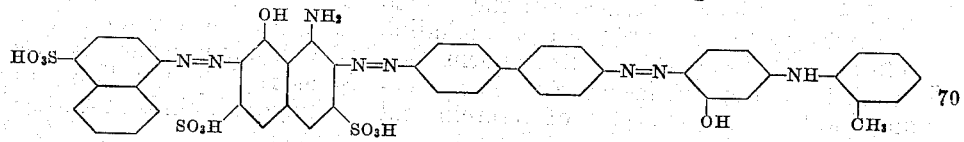

can be isolated by salting out from its slight alkaline solution and constitutes in dry state a black powder, easily soluble in cold water with dark violet and in concentrated sulphuric acid with a deep blue coloration. Its aqueous solutions, when heated with zinc dust, are rapidly nearly decolorized, but become deep blue in contact with air.

It dyes artificial silk from regenerated cellulose and animal fibres from neutral or slightly acid bath in deep black shades. It is also very suitable for leather-dyeing by all usual dyeing processes.

*Example 6*

18.4 parts of tetrazotized benzidine are combined in a mineral acid solution with 31.9 parts of 1:8-amidonaphthol-3:6-disulphonic acid and the intermediate product obtained is further combined in presence of sodium carbonate with 30.3 parts of diazotized 2-aminonaphthalene-3:6-disulphonic acid. The formation of the disazo-dyestuff occurs very rapidly. By adding thereto a solution of 19.9 parts of N-(o-tolyl-)m-aminophenol dissolved in 400 parts of water and 19 parts of a sodium hydroxide solution of 30%, the new trisazo dyestuff is formed.

The isolated dyestuff having the formula:

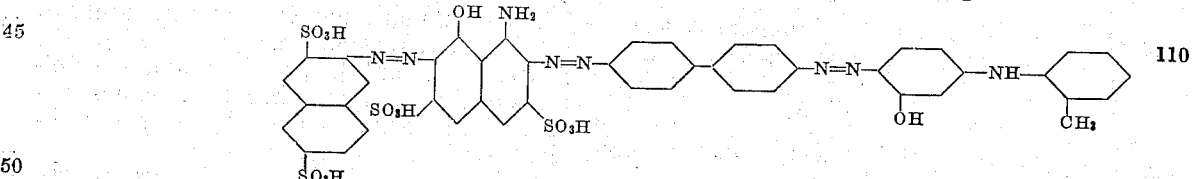

constitutes in dry state a black powder, easily soluble in cold water with a blue-violet and in concentrated sulphuric acid with a blue coloration. Its aqueous solutions are decolorized on heating with zinc powder, but become very rapidly deep blue in contact with air.

The new dyestuff dyes leather tanned in any usual manner in bluish black shades.

*Example 7*

The intermediate product prepared as described in Example 1 from 18.4 parts of benzidine and 31.9 parts of 1.8-aminonaphthol-3:6-disulphonic acid is combined with a diazo compound prepared from 17.3 parts of p-amino-benzenesulphonic acid and the disazo dyestuff obtained is transformed into the trisazo dyestuff by adding thereto a caustic alkaline solution of 21.4 parts of the condensation product from one molecule of m-phenylenediamine with one molecule of resorcin and possessing the formula:

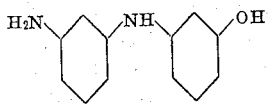

The new trisazo dyestuff isolated from its solution by means of salt constitutes in dry state a black powder, with a greenish glance, easily soluble in water. Its aqueous solution when being heated with zinc powder is rapidly decolorized, but becomes immediately deep blue violet in contact with air. In concentrated sulphuric acid it is soluble with a deep blue coloration.

According to its good solubility the dyestuff is advantageously used for dyeing all kinds of leather. It dyes wool, silk and artificial silk in deep black shades.

By replacing in this example the 21.4 parts of amino - phenol - m - aminophenol by an equivalent quantity of o-methoxy-phenyl-m-aminophenol of the formula:

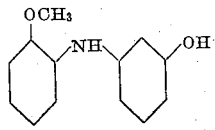

(prepared by condensing one molecule of o-anisidine with one molecule of resorcin in presence of zinc chloride) or of o-chlorphenyl-m-aminophenol of the formula:

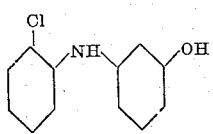

easily soluble dyestuffs giving black shades on leather, wool, silk and artificial silk are obtained.

*Example 8*

One molecule of the disazo dyestuff prepared as described in Example 7 is combined in a caustic alkaline solution with one molecule of dichlorophenyl-m-aminophenol of the formula:

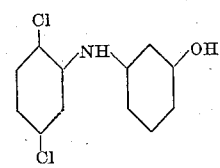

(prepared by condensing one molecule of 2-5-dichloraniline with one molecule of resorcin, in presence of zinc chloride).

The dyestuff thus obtained is a black powder with a reddish glance, easily soluble in water with a deep violet blue, and in concentrated sulphuric acid with a deep blue coloration. Its aqueous solution, when being heated with zinc powder, is decolorized, but becomes rapidly deep blue on contact with air.

It dyes all kinds of leather in a deep greenish black.

Generally it may be noted that the process can be carried out with tetrazo-compounds of any other diamines of the diphenyl series, such as for example ortho-tolidine or dianisidine.

What we claim is:—

1. A process for the manufacture of trisazo-dyestuffs, consisting in first combining in mineral acid solution one molecule of a tetrazotized diamine of the diphenyl series with one molecule of 1:8-aminonaphthol-3:6-disulphonic acid and then coupling the intermediate product with one molecule of a sulphonated monodiazo compound of the benzene and naphthalene series and one molecule of a meta-amino-phenol compound substituted in the amino group by at least one of alkyl-, phenyl- or naphthalene radicles.

2. A process for the manufacture of trisazo-dyestuffs, consisting in first combining in mineral acid solution one molecule of a tetrazotized diamine of the diphenyl series with one molecule of 1:8-aminonaphthol-3:6-disulphonic acid and then coupling the intermediate product with one molecule of a sulphonated monodiazo-compound of the benzene and naphthalene series and one molecule of a meta-amino-phenol compound monosubstituted in the amino group by an alkyl-, phenyl- or naphthalene radicle.

3. A process for the manufacture of trisazo-dyestuffs, consisting in first combining in mineral acid solution one molecule of a tetrazotized diamine of the diphenyl series with one molecule of 1:8-aminonaphthol-3:6-disulphonic acid and then coupling the intermediate product with one molecule of a sulphonated monodiazo compound of the benzene and naphthalene series and one molecule of a meta-aminophenol compound substituted in the amino-group by one aryl radicle.

4. A process for the manufacture of trisazo-dyestuffs, consisting in first combining in mineral acid solution one molecule of a tetrazotized diamine of the diphenyl series with one molecule of 1:8-aminonaphthol-3:6-disulphonic acid and then coupling the intermediate product with one molecule of a sulphonated monodiazo compound of the benzene and naphthalene series and one molecule of N-(o-tolyl)-m-aminophenol.

5. A process for the manufacture of a trisazo-dyestuff, consisting in first combining in mineral acid solution one molecule of tetrazotized benzidine with one molecule of 1:8 - aminonaphthol - 3:6 - disulphonic acid and then coupling the intermediate product with one molecule of 1-diazobenzene-4-sulphonic acid and one molecule of N-(o-tolyl-)m-aminophenol.

6. A process for the manufacture of a trisazo dyestuff, consisting in first combining in mineral acid solution one molecule of tetrazotized benzidine with one molecule of 1:8-aminonaphthol-3:6-disulphonic acid and then coupling the intermediate product with one molecule of 1-diazo-2-methyl-benzene-4-sulphonic acid and one molecule of N-(o-tolyl)-m-aminophenol.

7. A process for the manufacture of a trisazo dyestuff, consisting in first combining in mineral acid solution one molecule of tetrazotized benzidine with one molecule of 1:8-aminonaphthol-3:6-disulphonic acid and then coupling the intermediate product with one molecule of 1-diazonaphthalene-4-sulphonic acid and one molecule of N-(o-tolyl-)m-aminophenol.

8. As a new article of manufacture the trisazo-dyestuffs of the general formula:

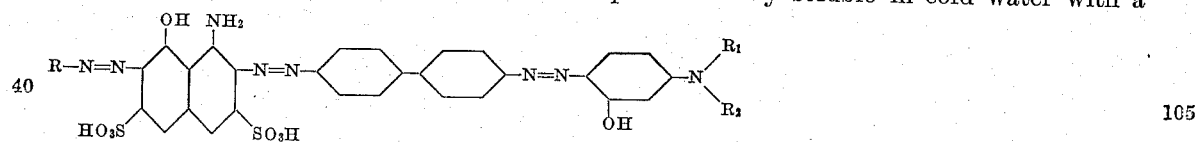

wherein R represents a benzene or naphthalene nucleus containing at least one sulphonic group and which may further contain halogen, alkyl, amido and nitro groups, $R_1$ represents alkyl and aryl groups of the benzene and naphthalene series and $R_2$ represents hydrogen and alkyl groups, said dyestuffs constituting in dry form dark powders, easily soluble in cold water with a dark red violet, violet to blue violet and in concentrated sulphuric acid with a deep blue-violet coloration, their aqueous solutions when heated with zinc yielding nearly colorless solutions becoming deep blue in contact with air and which dye artificial silk, wool, natural silk and leather in level black shades.

9. The herein described trisazo dyestuff having the formula:

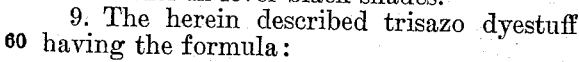

and which constitutes in dry form a grey black powder, easily soluble in water with a dark violet and in concentrated sulphuric acid with a deep blue coloration, their aqueous solutions, when heated with zinc powder, yielding nearly colorless solutions becoming deep blue in contact with air and which dye artificial silk, wool, natural silk and leather in level black shades.

10. The herein described trisazo dyestuff having the formula:

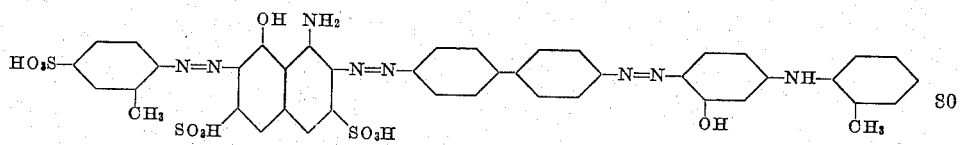

and which constitutes in the dry form a black powder easily soluble in cold water with a dark violet and in concentrated sulphuric acid with a deep blue coloration, their aqueous solutions, when heated with zinc powder, yielding nearly colorless solutions becoming deep blue in contact with air and which dye artificial silk, wool, natural silk and leather in level black shades.

11. The herein described trisazo dyestuff having the formula:

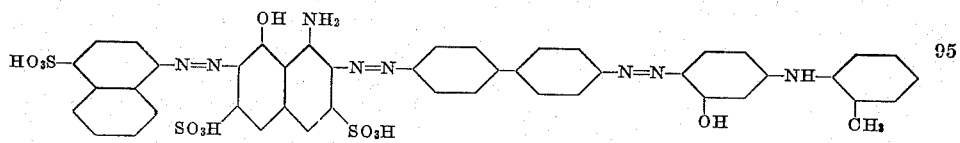

and which constitutes in dry state a black powder easily soluble in cold water with a dark violet and in concentrated sulphuric acid with a deep blue coloration, their aqueous solutions, when heated with zinc powder, yielding nearly colorless solutions becoming deep blue in contact with air and which dye artificial silk, wool, natural silk and leather in level black shades.

In witness whereof we have hereunto signed our name this 12th day of June, 1931.

HANS LEEMANN.
HEINRICH LIER.
OSKAR KNECHT.